Figure 1:
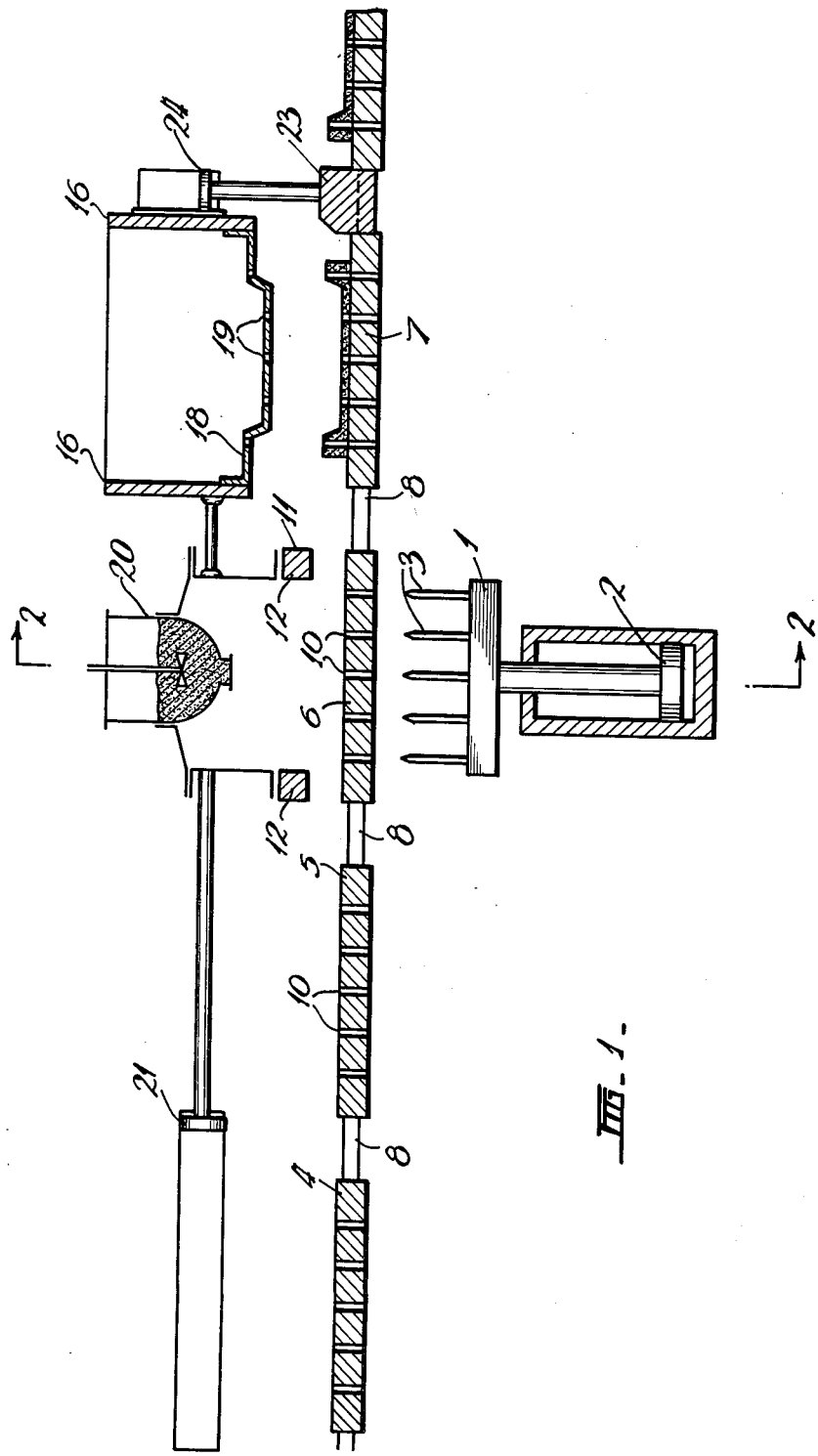

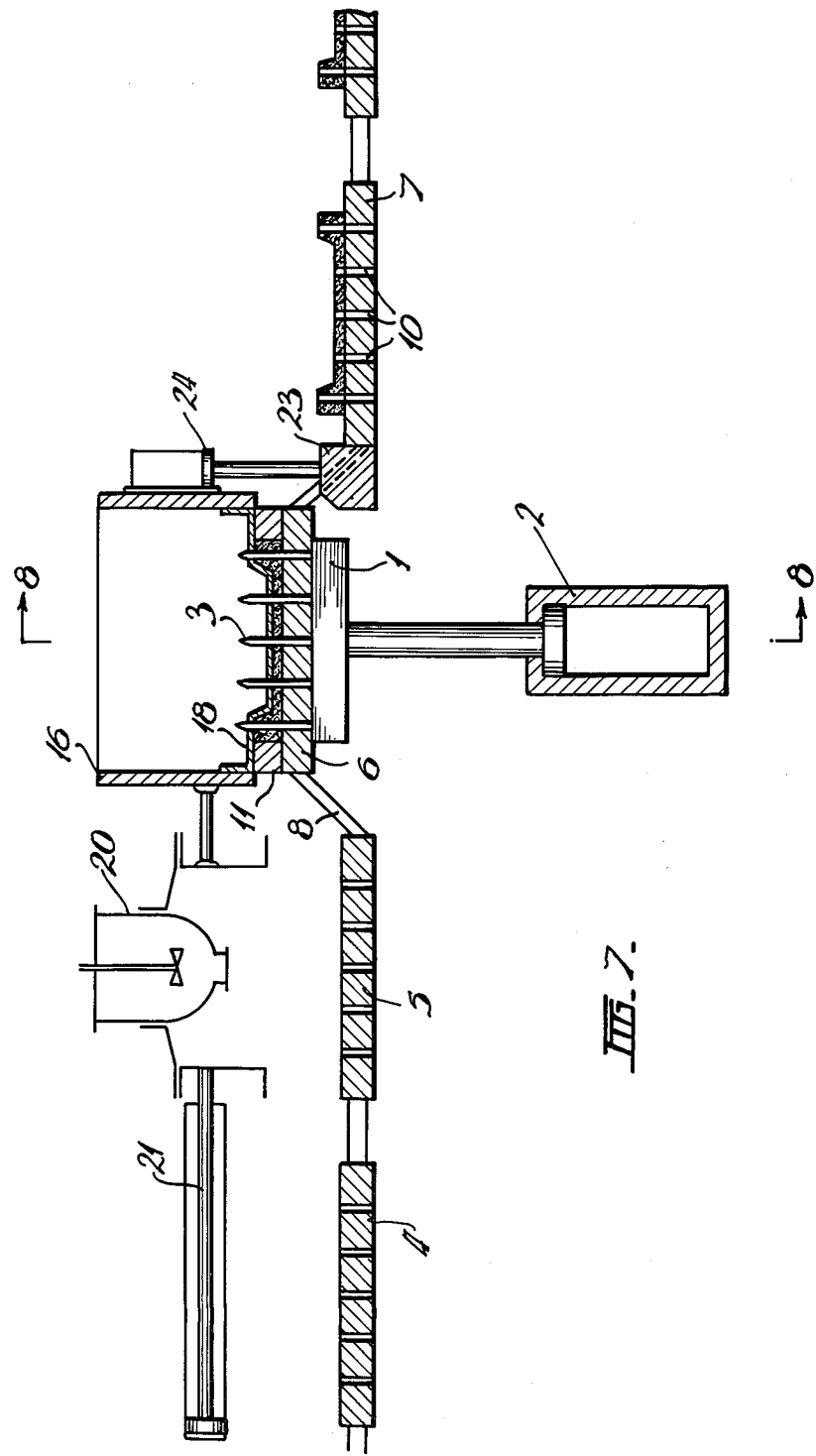

United States Patent Office 3,049,784
Patented Aug. 21, 1962

3,049,784
MACHINE FOR THE MANUFACTURE OF
MOULDED PERFORATED ARTICLES
Frank Sansom Cullen, North Balwyn, Victoria, Australia, assignor to Insulwool Products Proprietary Limited, Melbourne, Victoria, Australia, a company of Victoria
Filed Mar. 8, 1960, Ser. No. 13,598
2 Claims. (Cl. 25—42)

This invention relates to machines for the manufacture of moulded perforated articles and refers especially to machines suitable for the manufacture of acoustic plaster tiles.

In previous machines, such as that described in our Australian Patent No. 210,362, it has been necessary to leave a formed, but only partly set, tile on the mould plate or platen in the machine until sufficiently strong to allow it to be handled. The period required for this may be as much as five times the period required for actually moulding the tile, for instance five minutes for setting time after a moulding time of one minute. Thus the machine was only performing its moulding function for a small proportion of the total cycle.

The object of the present invention is to substantially increase the ratio of moulding time to total operational time, in machines of the type referred to.

A further object of the invention is to facilitate placing of the plaster in the mould by removing the obstruction due to the upper mould form.

A moulding machine in accordance with the invention comprises a base carrying pin or like projections which are adapted to form perforations in the moulded article, a series of movable stripper plates each of which is adapted to fit over the base and in this position to form the lower moulding surface for the article, the said stripper plates each being provided with apertures through which the pins project in the moulding position, a movable flask or the like adapted to seat on or around the stripper plate for the time being in the moulding position and thereby to form the lateral moulding faces for the article, an upper plate adapted to act as the upper surface of the mould, mould filling means above the base and movable flask, means to apply moulding pressure to material fed to the mould by the mould filling means, and means adapted to move one of the stripper plates from the moulding position after the pins or like projections of the base have been withdrawn from the apertures therein, the movement of the said one stripper plate from the moulding position causing the next stripper plate of the series to move into the moulding position.

The invention also includes a moulding machine which comprises a base carrying pins or like projections which are adapted to form perforations in the moulded article, a series of movable stripper plates each of which is adapted to fit over the base and in this position to form the lower moulding surface for the article, the said stripper plates each being provided with apertures through which the pins or projections project in the moulding position, a movable flask or the like adapted to seat on or around the stripper plate for the time being in the moulding faces for the article, and upper plate movable between a first position in which it acts as the upper surface of the mould and a second position in which it is displaced to clear the base and movable flask, mould filling means movable between a first position displaced from the base and movable flask and a second or filling position in which it is located immediately above the base and movable flask, means to apply moulding pressure to material fed to the mould by the mould filling means, means operable to move said upper plate and mould filling means alternatively between said first and second positions, and means to substitute one of said series of stripper plates for another member of said series in position above said base.

Preferably the upper plate and the mould filling means are mounted on a frame which is reciprocated in the line of movement of successive stripper plates by a ram and said frame is provided with means to engage the stripper plates and thereby position successive stripper plates above the base.

The stripper plates may be connected by links to form an endless chain so that the stripper plates, after supporting the articles for sufficient length of time for setting, are returned to the filling position of the machine.

Preferably the base is moved vertically to apply the moulding pressure and the stripper plates may be provided with guide grooves at the sides, said grooves being adapted to engage spring-mounted rollers when a stripper plate is positioned above the base, thereby permitting the stripper plate to co-act with the base when it is moved during the operations of filling and pressing an article as hereinafter described.

To facilitate the detailed description of one form of machine in accordance with the invention and its manner of operation, reference will now be made to the accompanying drawings which show a machine for the manufacture of acoustic tiles from gypsum plaster. In the drawings—

Figure 2:
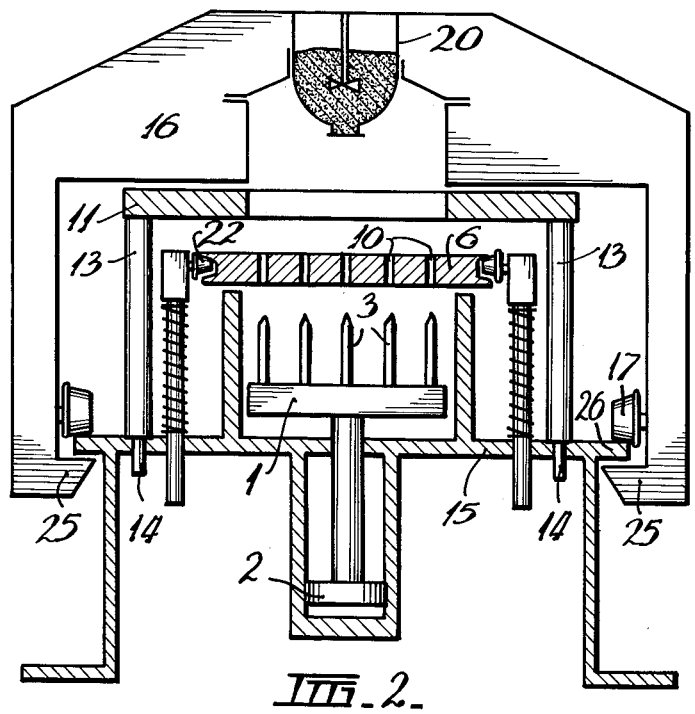
Figure 8:
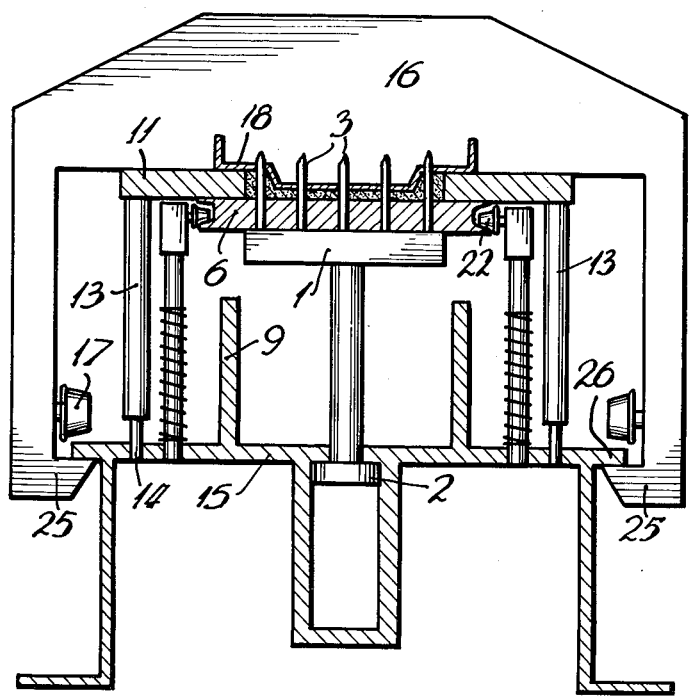
Figure 4:
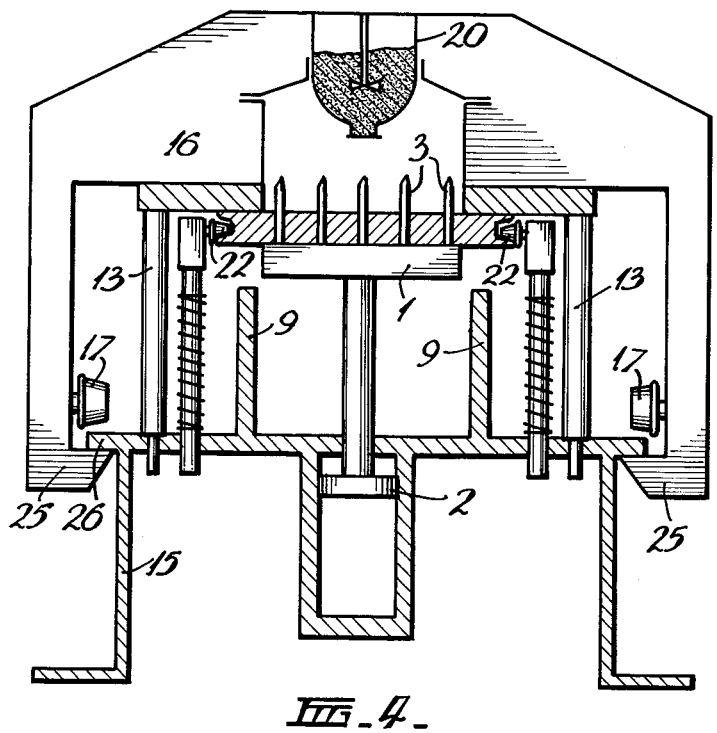
Figure 3:
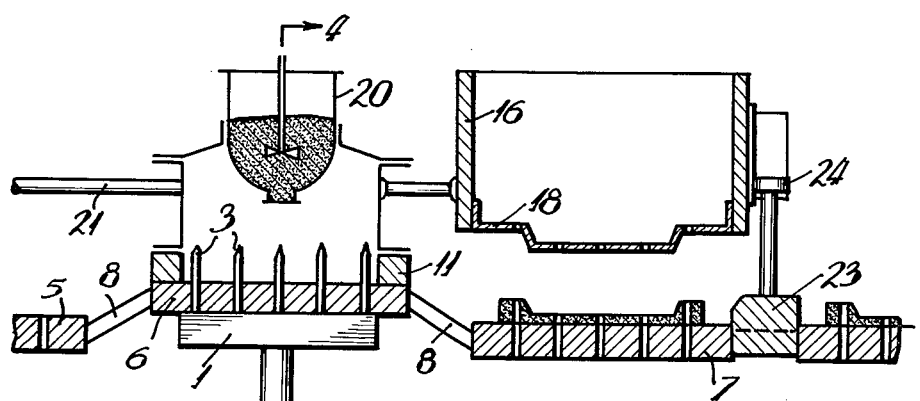
Figure 6:
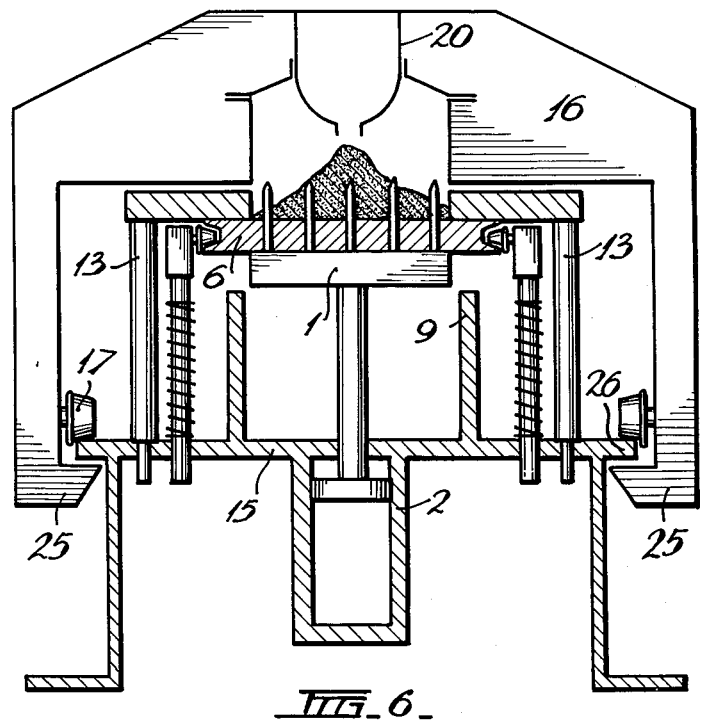
Figure 5:
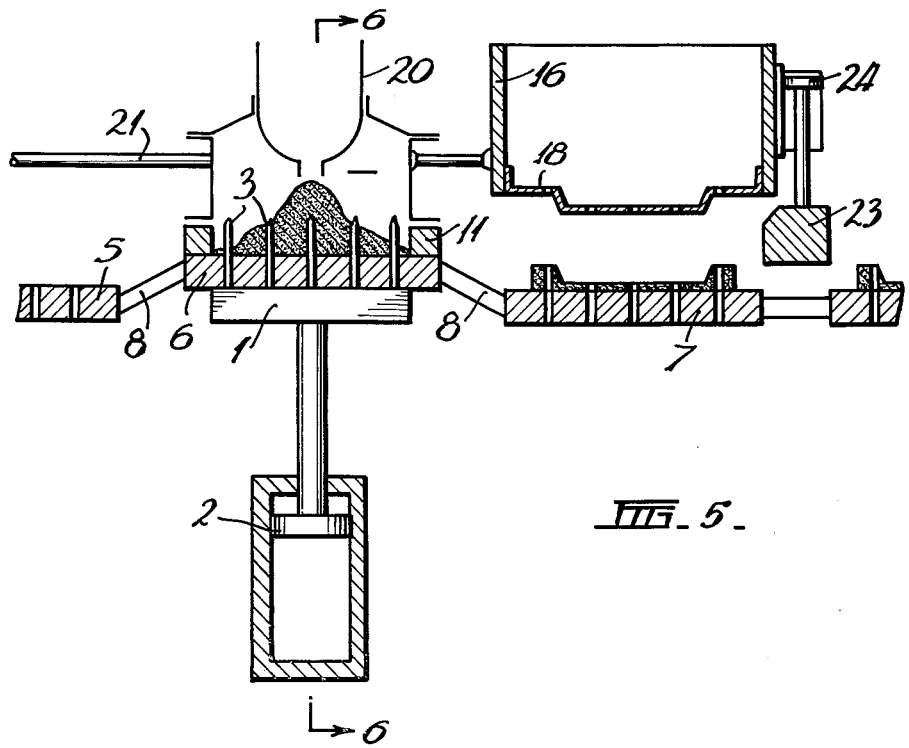
Figure 10:
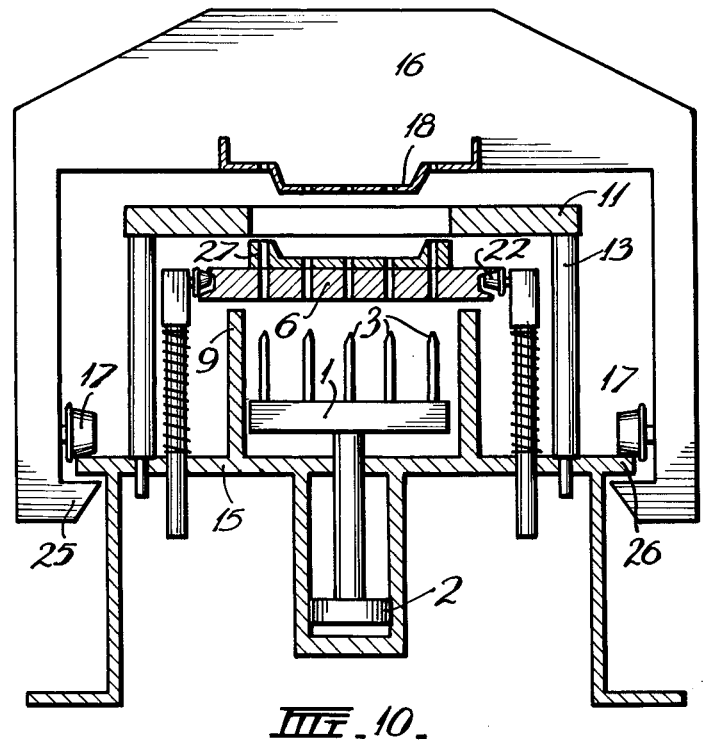
Figure 9:
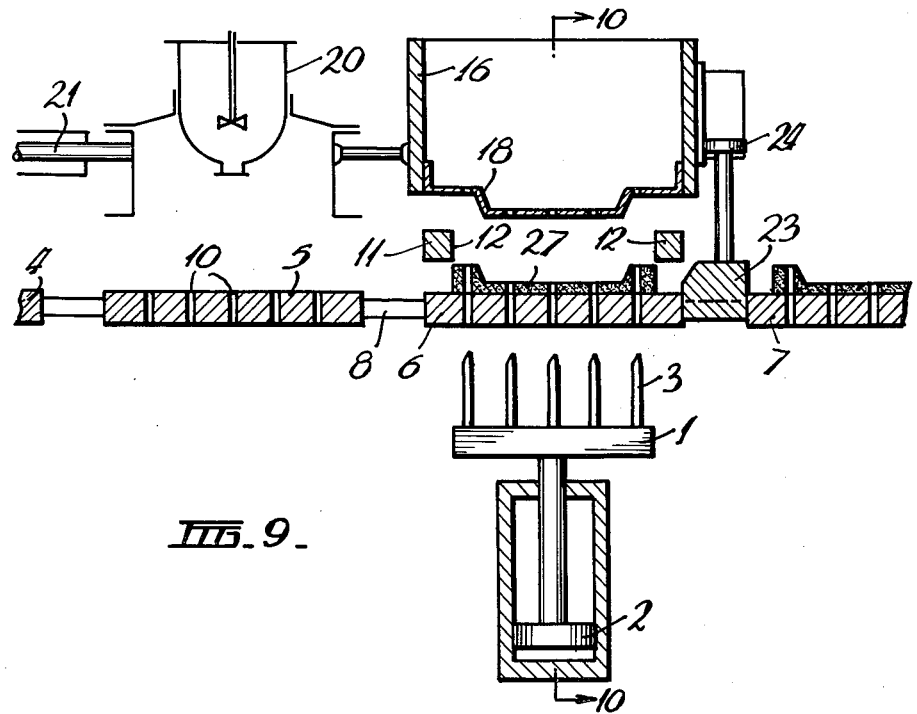

FIGURE 1 is a schematic view showing the machine in sectional elevation at the commencement of a cycle, FIGURE 2 is a section taken along the line 2—2 of FIGURE 1, FIGURE 3 is a view similar to FIGURE 1 with pins inserted through a stripper plate, FIGURE 4 is a section along the line 4—4 of FIGURE 3, FIGURE 5 is a view similar to FIGURE 1 showing the disposition of the parts of the machine during pouring of the plaster, FIGURE 6 is a section along line 6—6 of FIGURE 5, FIGURE 7 is a view similar to FIGURE 1 showing the disposition of the parts of the machine during the operation of pressing a tile, FIGURE 8 is a section along line 8—8 of FIGURE 7, FIGURE 9 is a view similar ot FIGURE 1 showing the disposition of the parts of the machine after completion of a tile making operation, and FIGURE 10 is a section along the line 10—10 of FIGURE 9.

In this embodiment, all operations are performed by means of reciprocating hydraulic or pneumatic rams. A base plate 1 is carried by a ram 2 adapted to reciprocate it vertically and is provided on its upper surface with a series of upstanding pins 3 disposed in the pattern in which it is desired that the perforations should be formed in the moulded tile. A series of stripper plates 4, 5, 6, 7, are joined together by links 8 to form an endless chain and are mounted on guide rails 9 so that each stripper plate may in turn be moved into position above the base plate 1. Each stripper plate is provided with apertures 10 adapted to fit closely around the pins 3 mounted on the base plate 1. A rectangular hollow flask 11 is provided with a pair of flanges on opposite sides and is adapted to seat on the upper surface of a stripper plate to form the lateral moulding faces 12 for a tile. The flask 11 is located in its correct position in relation to the stripper plates by means of vertical column 13 which pass through apertures 14 in the frame 15 of the machine. A restraint frame 16 is mounted on roller 17 so that it may slide along the main frame 15 of the machine in the line of movement of the stripper plates. The restraint frame 16 carries the upper moulding plate 18 for the tiles which is provided with apertures 19 to receive the upper ends of the pins 3 of the base 1 which project through the stripper plate when the mould is fully closed, and also carries a filling hopper 20 for filling the mould with plaster. The restraint frame 16 may be reciprocated horizontally by means of a second ram 21 so that either it is in a first position with the upper plate located immediately above the base plate (FIGURES 7, 8, 9, 10), or in a second position in which the filling hopper is located above the base plate. (FIGURES 1, 2, 3, 4, 5, 6.)

Operation of the machine begins with the restraint frame 16 in the filling position and with a stripper plate 6 located immediately above the base plate 1 (FIGURE 1). The base plate 1 is raised by means of its ram 2 to pass the pins 3 through the stripper plate 6 and lift the stripper plate 6 upwards to contact the flask 11 (FIGURE 3). This upward movement is continued until the flask 11 comes into engagement with the restraint frame 16 (see FIGURE 4). The upward movement of the stripper plate 6 is possible because it is supported at this position on spring-mounted rollers 22 and not on the rigid track which supports the stripper plates during the remainder of their travel. The base plate 1 is then dropped slightly and plaster introduced into the mould from the hopper 20. A vertical tongue 23 which is mounted on the restraint frame 16 and is normally in engagement with a space between two successive stripper plates is then retracted from its engagement position by a small auxiliary ram 24 (FIGURE 5). The restraint frame 16 is then moved horizontally by means of the second ram 21 to position the upper moulding plate 18 over the base plate 1 and flask 11. In this position of the frame, the tongue 23 on the restraint frame 16 is lowered by means of its ram 24 and the base plate 1 is moved further upwards so that the pins 3 pass through the holes 19 in the upper form and the plaster is compressed between the stripper plate 6 and the upper form 18 to mould a tile.

During the pressing operation (FIGURES 7 and 8), the restraint frame 16 is held against the upward-force exerted by the base plate ram 2 by means of projecting inwardly directed shoulders 25 which pass under flanges 26 at the base of the machine and lock the restraint frame 16 to the main frame 15 of the machine. When the tile 27 has been consolidated by pressing, the ram 2 carrying the base plate 1 is withdrawn, thereby removing the pins 3 from the moulded article 27 and the stripper plate 6. The movable flask 11 is prevented by stops on its supporting columns 13 from moving downwardly with the base plate 1 and is thereby withdrawn from engagement with the moulded tile 27. The spring-mounted rollers 22 which are in engagement with the stripper plate 6 permit the stripper plate 6 to move downwardly only to the level of the horizontal track 9 carrying the other stripper plates, and the pins 3 are thereby withdrawn from the stripper plate 6 to leave a moulded tile 27 in position on the stripper plate (FIGURE 9).

The second ram 21 is now actuated to return the restraint frame to the filling position. Because the tongue 23 is in engagement between two of the stripper plates, the chain of stripper plates is also moved horizontally by this action, and a fresh stripper plate 5 is thereby positioned above the base plate 1 in preparation for forming a new tile. The above procedure is then repeated in order to form another acoustic tile.

The stripper plates are thus moved in turn into the moulding position and after a moulded tile has been formed on a stripper plate, it remains on the stripper plate while further tiles are being moulded. A sufficient number of stripper plates are provided in the series to allow ample setting time for the tiles before they need be removed from the stripper plates. In this way, the machine can be left in continuous effective operation and the disadvantage of our previous machine is avoided.

While one embodiment of the invention has been described above, it is not intended that the invention should be limited to this one form. Modifications and adaptations may be made without departing from the spirit and scope of the invention. For example, while the upper plate and filling hopper have been described as being reciprocated, it is possible to invert the actuating mechanism and to move the base plate and its actuating ram horizontally while keeping the filling hopper and upper plate stationary. Also the tongue which is adapted to engage the stripper plates in order to move them, and its actuating ram, may be replaced by a pawl or other suitable device.

I claim:

1. Apparatus for the manufacture of moulded perforated articles comprising a main frame, a horizontally disposed base plate mounted for vertical reciprocating movement on said main frame and being provided with a plurality of upwardly projecting pins, first thrust means to effect vertical movement of said base plate, stripper plate guide means extending transversely over said base plate, a chain of interconnected stripper plates intermittently movable one behind the other on said guide means and successively coming to rest in registered position over said base plate, and each of said stripper plates being provided with apertures to receive the pins on said base plate, links connecting said stripper plates together and permitting relative vertical movement between adjacent stripper plates, and said guide means permitting vertical movement of the stripper plate overlying said base plate, a restraint frame overlying said stripper plates and mounted for horizontal reciprocal movement on said main frame along the line of movement of said stripper plates, an upper plate provided with apertures to receive said base plate pins and overlying said stripper plates and supported by and movable with said restraint frame, filling means mounted on and movable with said restraint frame over said stripper plates, said filling means being adjacent the upper plate, second thrust means connected to said restraint frame, for reciprocating said restraint frame horizontally to alternately bring said upper plate and said filling means into position over said base plate, means carried by said restraint frame and contacting the stripper plate and operable to lock said chain of stripper plates to said restraint frame to effect corresponding movement of said chain on movement of the restraint frame in one direction to advance a stripper plate into position between said base plate and said filling means, said locking means being operable to release said chain of stripper plates to enable said restraint frame to move in the other direction without horizontal movement of said chain, a flask located above said base plate in position between said chain of stripper plates and said filling means and upper plate, means supporting said flask for vertical reciprocal movement along the line of movement of said base plate, said flask seating on a stripper plate located over said base plate to form with such stripper plate a mould to receive material when said base plate is raised by said first thrust means, said filling means being operable to discharge material to be moulded in the mould formed by said flask and associated stripper plate in the raised condition of said base plate, said locking means being operable after the discharge of such material into such mould to enable said second thrust means to move said restraint frame in said other direction to move said upper plate into position over the material discharged into the mould formed by said flask and the associated stripper and without moving the latter horizontally from its position over said base plate, said first thrust means being then operable to raise said base plate to mould the material between such associated stripper plate, said flask and said upper plate, and thereafter to lower said base plate to withdraw the pins thereof from the moulded article and the moulded article from the flask, leaving the article on the associated stripper plate.

2. Apparatus as claimed in claim 1, in which the said guide means comprises rails extending horizontally on the main frame and resilient means supporting the stripper plates in the moulding position and permitting limited vertical movement of said stripper plates.

References Cited in the file of this patent

UNITED STATES PATENTS

| | | |
|---|---|---|
| 1,161,188 | Coffman | Nov. 23, 1915 |
| 1,721,017 | Gurney | July 16, 1929 |
| 2,407,514 | Rembert | Sept. 10, 1946 |
| 2,436,176 | Novello | Feb. 17, 1948 |
| 2,496,016 | Nelson | Jan. 31, 1950 |